United States Patent
Kang et al.

(10) Patent No.: US 11,680,153 B2
(45) Date of Patent: Jun. 20, 2023

(54) RUBBER COMPOSITION

(71) Applicant: LG Chem, Ltd., Seoul (KR)

(72) Inventors: Suk Youn Kang, Daejeon (KR); Jin Sook Ryu, Daejeon (KR); Kyoung Hwan Oh, Daejeon (KR); Jeong Heon Ahn, Daejeon (KR)

(73) Assignee: LG Chem, Ltd.

( * ) Notice: Subject to any disclaimer, the term of this patent is extended or adjusted under 35 U.S.C. 154(b) by 637 days.

(21) Appl. No.: 16/637,925

(22) PCT Filed: Nov. 21, 2018

(86) PCT No.: PCT/KR2018/014366
§ 371 (c)(1),
(2) Date: Feb. 10, 2020

(87) PCT Pub. No.: WO2019/103457
PCT Pub. Date: May 31, 2019

(65) Prior Publication Data
US 2020/0172698 A1    Jun. 4, 2020

(30) Foreign Application Priority Data

Nov. 21, 2017 (KR) .................. 10-2017-0155606

(51) Int. Cl.
C08K 3/04 (2006.01)
C08K 5/09 (2006.01)
C08K 3/06 (2006.01)
C08K 3/22 (2006.01)
C08F 8/32 (2006.01)
C08L 51/04 (2006.01)

(52) U.S. Cl.
CPC .......... *C08K 3/04* (2013.01); *C08F 8/32* (2013.01); *C08K 3/06* (2013.01); *C08K 3/22* (2013.01); *C08K 5/09* (2013.01); *C08L 51/04* (2013.01); *C08K 2003/2296* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 6,977,281 B1 | 12/2005 | Ozawa et al. | |
| 8,674,030 B2 * | 3/2014 | Lee .................. | C08C 19/44 525/333.1 |
| 9,090,730 B1 | 7/2015 | Mazumdar et al. | |
| 2006/0025539 A1 | 2/2006 | Ozawa et al. | |
| 2011/0009583 A1 | 1/2011 | Yan et al. | |
| 2014/0243447 A1 | 8/2014 | Cho et al. | |
| 2014/0243476 A1 | 8/2014 | Lee et al. | |
| 2014/0371383 A1 | 12/2014 | Hayata et al. | |
| 2017/0002103 A1 | 1/2017 | Sohn et al. | |
| 2017/0066850 A1 | 3/2017 | Lee et al. | |
| 2017/0275400 A1 * | 9/2017 | Hirata .................. | C08C 19/00 |
| 2019/0185598 A1 * | 6/2019 | Tartamella .............. | C08F 36/06 |
| 2019/0389987 A1 | 12/2019 | Jeon et al. | |
| 2020/0010596 A1 | 1/2020 | Kim et al. | |
| 2020/0087419 A1 | 3/2020 | Bae et al. | |
| 2020/0377625 A1 | 12/2020 | Ryu et al. | |
| 2021/0040241 A1 | 2/2021 | Oh et al. | |

FOREIGN PATENT DOCUMENTS

| | | |
|---|---|---|
| CN | 110099930 A | 8/2019 |
| CN | 110366568 A | 10/2019 |
| CN | 110997787 A | 4/2020 |
| CN | 111164109 A | 5/2020 |
| EP | 2223959 A1 * | 9/2010 |
| EP | 3351570 A1 | 7/2018 |
| EP | 3409718 A1 | 12/2018 |
| EP | 3539994 A1 | 9/2019 |
| EP | 3689960 A2 | 8/2020 |
| JP | 2003514079 A | 4/2003 |
| JP | 2005232351 A | 9/2005 |
| JP | 2009287020 A | 12/2009 |
| JP | 2011514421 A | 5/2011 |
| JP | 2012087200 A | 5/2012 |
| JP | 2012172077 A | 9/2012 |
| JP | 5436051 B2 | 3/2014 |
| JP | 2014534291 A | 12/2014 |

(Continued)

OTHER PUBLICATIONS

Product brochure for N-(3-triethoxysilylpropyl)-4,5-dihydroimidazole having a CAS No. 58068-97-6 by Alfa Chemistry, 7 pages, Downloaded on Aug. 24, 2022.*
Product brochure for Bis(methyldimethoxysilylpropyl)-N-methyamine, 95%, having a CAS No. 115710-91-3 by Cymit Quimica S.L., 6 pages, Downdloaded on Aug. 24, 2022.*
11-page brochure for 3-glycidyloxypropyltrimethoxysilane, CAS No. 2530-83-8 by Millipore Sigma, Downloaded on Dec. 22, 2022.*
Search Report dated Apr. 19, 2022 from the Office Action for Chinese Application No. 2018800523886 dated Apr. 24, 2022, pp. 1-3.

(Continued)

*Primary Examiner* — Tae H Yoon
(74) *Attorney, Agent, or Firm* — Lerner David LLP

(57) ABSTRACT

The present invention relates to a rubber composition having excellent tensile properties and viscoelasticity properties and including a conjugated diene-based polymer. The rubber composition may include a modified conjugated diene-based polymer which is selected considering target tensile properties and viscoelasticity properties, by predicting in advance the correlation between the modification ratio of the modified conjugated diene-based polymer and the dynamic viscoelasticity loss coefficient at 60° C. of the rubber composition through Mathematical Formula 1 and Mathematical Formula 2. Therefore, excellent compounding properties may be shown.

13 Claims, 2 Drawing Sheets

(56) References Cited

FOREIGN PATENT DOCUMENTS

| | | |
|---|---|---|
| JP | 5698560 B2 | 4/2015 |
| JP | 2016014122 A | 1/2016 |
| JP | 2016074877 A | 5/2016 |
| JP | 2017002189 A | 1/2017 |
| KR | 101310868 B1 | 10/2013 |
| KR | 20140028133 A | 3/2014 |
| KR | 20150131465 A | 11/2015 |
| KR | 20160062950 A | 6/2016 |
| KR | 20160084287 A | 7/2016 |
| KR | 20170077614 A | 7/2017 |
| WO | 0134659 A1 | 5/2001 |
| WO | 2018008911 A1 | 1/2018 |
| WO | 2018105920 A1 | 6/2018 |
| WO | 2018150043 A1 | 8/2018 |
| WO | 2019066396 A2 | 4/2019 |
| WO | 2019083173 A1 | 5/2019 |

OTHER PUBLICATIONS

Cools PJ, Maesen F, Klumperman B, Van Herk AM, German AL. Determination of the chemical composition distribution of copolymers of styrene and butadiene by gradient polymer elution chromatography. Journal of Chromatography A. Jun. 7, 1996;736(1-2):125-30.

Jennings J, Beija M, Kennon JT, Willcock H, O'Reilly RK, Rimmer S, Howdle SM. Advantages of block copolymer synthesis by RAFT-controlled dispersion polymerization in supercritical carbon dioxide. Macromolecules. Sep. 10, 2013;46(17):6843-51.

International Search Report for PCT/KR2018/014366 dated Mar. 4, 2019.

Extended European Search Report including Written Opinion for Application No. EP18880827.3 dated Sep. 21, 2020, 8 pgs.

* cited by examiner

RUBBER COMPOSITION

CROSS-REFERENCE TO RELATED APPLICATIONS

The present application is a national phase entry under 35 U.S.C. § 371 of International Application No. PCT/KR2018/014366 filed Nov. 21, 2018, which claims priority from Korean Patent Application No. 10-2017-0155606 filed Nov. 21, 2017, all of which are incorporated herein by reference.

TECHNICAL FIELD

The present invention relates to a rubber composition having excellent tensile properties and viscoelasticity properties and including a conjugated diene-based polymer.

BACKGROUND ART

Recently, according to increased interest on energy saving and environmental issues, decrease of the fuel consumption ratio of cars is required. As a method for accomplishing the requirement, a polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. It is desirable to use a rubber material having high rebound resilience at the above temperature or low tan δ or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR rubber prepared by the solution polymerization is widely used as a rubber material for tires because it is easy to change a structure of the finally prepared SBR or BR rubber, and movement of chain terminals may be reduced and a coupling force with a filler such as silica and carbon black may be increased by coupling or modification of the chain terminals.

Meanwhile, in case where the conjugated diene-based polymer is modified, a modified part has a profound effect on compounding processability and physical properties through the interaction with an inorganic filler during preparing a rubber composition, and the effect is determined by the modification ratio of the conjugated diene-based polymer, i.e., the modified degree of the polymerization active part of the conjugated diene-based polymer. Thus, the modification ratio is used as an important index in determining the physical properties of a rubber composition.

In this regard, Japanese Patent Publication No. 5698560 discloses a relative measurement method with respect to a polystyrene gel using gel permeation chromatography (GPC) as a method for measuring a modification ratio. In detail, by using a silica-based column which is capable of absorbing a modified component and a polystyrene-based column which does not absorb a modified component, standard polystyrene which is not adsorbed onto a column is added as an internal index to a specimen and measurement is taken. From the difference of refractive index (RI) obtained through the measurement (slashed area in FIG. 1), a modification ratio is calculated according to Mathematical Formula 3 below.

$$\text{modification ratio}(\%) = \frac{\text{slashed area}}{PS \text{ column area}} \times 100 \qquad \text{[Mathematical Formula 3]}$$
$$\frac{(PS \text{ column area} - \text{silica column area})}{PS \text{ column area}} \times 100$$

However, the measurement of the modification ratio through the gel permeation chromatography requires a separate standard material named polystyrene, and the modification ratio is calculated from the comparison of chromatograms on a standard material with respect to a mixture of the standard material and a polymer. Accordingly, the accuracy of measurement may not be secured.

PRIOR ART DOCUMENT

Patent Document (Patent Document 1) JP5698560 B

DISCLOSURE OF THE INVENTION

Technical Problem

The present invention has been devised to solve the above-mentioned problems of the conventional technique, and an object of the present invention is to provide a rubber composition having excellent tensile properties and viscoelasticity properties and including a conjugated diene-based polymer.

Technical Solution

To solve the above-described tasks, there is provided a rubber composition including a modified conjugated diene-based polymer; a filler; and a vulcanizing agent, wherein the following Mathematical Formula 1 is satisfied:

$$Y = \frac{A}{0.6854X + 93.955} \qquad \text{[Mathematical Formula 100A]}$$

in Mathematical Formula 1, X is a modification ratio of the modified conjugated diene-based polymer, A is a dynamic viscoelasticity loss coefficient (tan δ) at 60° C. of a rubber composition including an unmodified conjugated diene-based polymer, where A has a real value of 0.147 to 0.160, and Y is a dynamic viscoelasticity loss coefficient (tan δ) at 60° C. of a rubber composition including a modified conjugated diene-based polymer.

Advantageous Effects

The rubber composition according to the present invention includes a modified conjugated diene-based polymer, wherein the rubber composition satisfies Mathematical Formula 1 and the modified conjugated diene-based polymer has a high modification ratio by controlling the purity of a modifier, thereby achieving excellent tensile properties and viscoelasticity properties.

In addition, the rubber composition of the present invention may include a modified conjugated diene-based polymer which is selected considering target tensile properties and viscoelasticity properties, by predicting in advance the correlation between the modification ratio of the modified conjugated diene-based polymer and the dynamic viscoelasticity loss coefficient at 60° C. of the rubber composition through Mathematical Formula 1. Also, the modification ratio may be controlled according to the purity of the modifier, and a rubber composition having an excellent viscoelasticity coefficient may be provided by controlling the modification ratio. Therefore, a rubber composition having excellent viscoelasticity properties may be provided with high reproducibility.

BEST MODE FOR CARRYING OUT THE INVENTION

Figure 1:
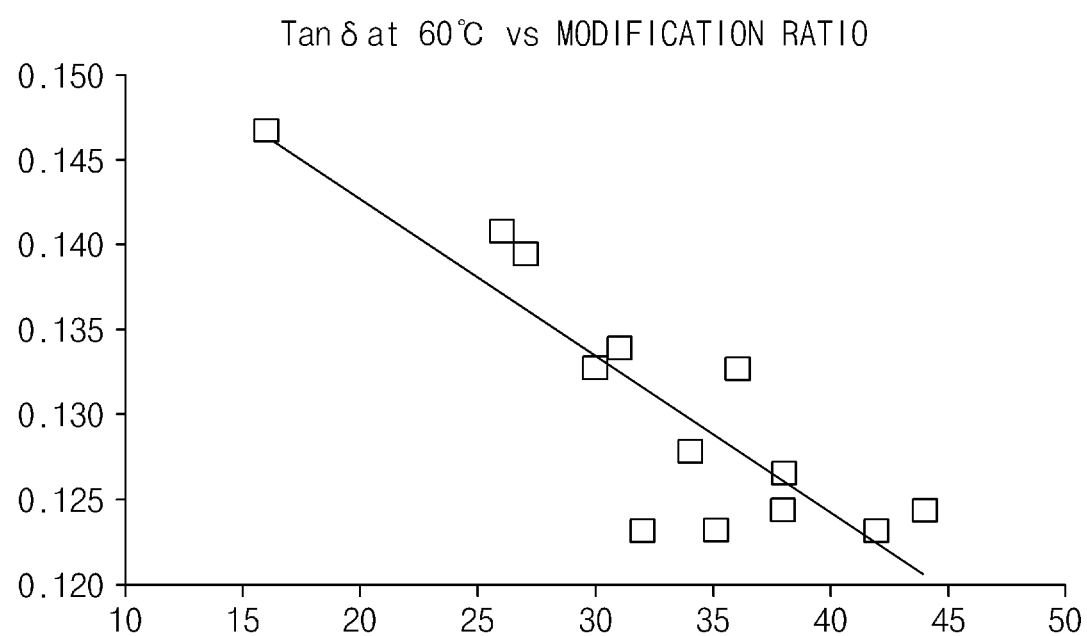
FIG. 1 is a graph showing the correlation between a dynamic viscoelasticity loss coefficient at 60° C. and the modification ratio of a modified conjugated diene-based polymer according to an embodiment of the present invention.

Hereinafter, the present invention will be described in more detail in order to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality including two or more substituents may be present according to the number of hydrogen present in the functional group, the atomic group or the compound, and if a plurality of substituents are present, each substituent may be the same or different.

The term "alkyl group" used in the present invention may mean monovalent aliphatic saturated hydrocarbon, and may include both linear alkyl group such as methyl, ethyl, propyl and butyl, and branched alkyl group such as isopropyl, sec-butyl, tert-butyl and neo-pentyl.

The term "cycloalkyl group" used in the present invention may mean cyclic saturated hydrocarbon, or a cyclic unsaturated hydrocarbon including one, two or more unsaturated bonds.

The term "aryl group" used in the present invention may mean cyclic aromatic hydrocarbon, and may include both monocyclic aromatic hydrocarbon with one ring, and polycyclic aromatic hydrocarbon with two or more rings.

The present invention provides a rubber composition having excellent tensile properties and viscoelasticity properties and including a conjugated diene-based polymer.

The rubber composition according to an embodiment of the present invention includes a modified conjugated diene-based polymer which is modified by a modifier having a purity of 92.0% or more; a filler; and a vulcanizing agent, wherein the following Mathematical Formula 1 is satisfied:

$$Y = \frac{A}{0.6854X + 93.955} \qquad \text{[Mathematical Formula 100A]}$$

In Mathematical Formula 1, X is a modification ratio of the modified conjugated diene-based polymer, A is a dynamic viscoelasticity loss coefficient (tan δ) at 60° C. of a rubber composition including an unmodified conjugated diene-based polymer, and Y is a dynamic viscoelasticity loss coefficient (tan δ) at 60° C. of a rubber composition including a modified conjugated diene-based polymer.

Here, A may particularly have a value of 0.140 to 0.160, and Y may particularly be 0.05 to 0.14.

In the Mathematical Formula, A value is a dynamic viscoelasticity loss coefficient of an unmodified conjugated diene-based polymer and may have somewhat different values according to commercially available polymer products and measurement conditions, and may generally have a value between 0.140 and 0.160, commonly, 0.147 and 0.160, and 0.150 or more.

The rubber composition according to an embodiment of the present invention may include a modified conjugated diene-based polymer of which modification ratio is controlled in accordance with target tensile properties and viscoelasticity properties, by predicting in advance the correlation with the dynamic viscoelasticity loss coefficient at 60° C. of the rubber composition through Mathematical Formula 1, by using of the modification ratio of the modified conjugated diene-based polymer and the dynamic viscoelasticity loss coefficient at 60° C. of the rubber composition including an unmodified polymer. Therefore, excellent tensile properties and viscoelasticity properties may be shown.

That is, if there is information on the dynamic viscoelasticity loss coefficient of the unmodified conjugated diene-based polymer which is not modified, the dynamic viscoelasticity loss coefficient of the modified conjugated diene-based polymer may be predicted according to the degree of a modification ratio. Accordingly, though not taking measurement in practice through mixing, compounding properties may be predicted only with a polymer.

In addition, the modified conjugated diene-based polymer is characterized in being modified using a modifier having a purity of 90.0% or more. The purity of the modifier is a factor influencing the modification ratio, and if the purity is 90.0% or more, excellent modification ratio may be attained.

Conventionally, the importance of the purity of the modifier was not acknowledged and in order to utilize the modifier having high purity, cost and time loss for purification was considerable. However, in the present invention, the purity of a modifier was found to be a factor relating to a modification ratio, and there is provided a modified conjugated diene-based polymer having an excellent modification ratio by controlling the purity to an appropriate degree.

The appropriate degree of the purity is required to be 90.0% or more, preferably, 92.0%, more preferably, 93.0% or more. In addition, when compared with the purity of less than 90%, if the purity of the modifier is 90% or more, the modification ratio may increase by a great deal, and if the purity is 93% or more, the modification ratio may increase by a great deal once more.

In addition, since the correlation between the modification ratio of the modified conjugated diene-based polymer and the dynamic viscoelasticity loss coefficient at 60° C. of the rubber composition may be predicted in advance through Mathematical Formula 1, the modification ratio of the polymer may be comprehended in advance in accordance with the required physical properties during preparing the modified conjugated diene-based polymer, and valid information for selecting a modifier, selecting a target modification ratio, selecting a target viscoelasticity loss coefficient, etc. during preparing the modified conjugated diene-based polymer may be provided. Further, a rubber composition having excellent viscoelasticity properties may be prepared with high reproducibility.

In the present invention, Mathematical Formula 1 is a regression equation derived by preparing 11 kinds of modified conjugated diene-based polymers having different modification ratios, measuring dynamic viscoelasticity loss coefficients at 60° C. using rubber compositions including the polymers, respectively, and making a comparison graph of the modified conjugated diene-based polymers and the dynamic viscoelasticity loss coefficient values (see FIG. 1).

In addition, in the present invention, the Y value represents the range of the dynamic viscoelasticity loss coefficient at 60° C. of the rubber composition as described above, and if the above-mentioned range is satisfied, the tensile properties and the viscoelasticity properties of the rubber composition may be excellent in balance.

In an embodiment of the present invention, the modified conjugated diene-based polymer may be a conjugated diene-based polymer catalyzed with a lanthanide rare earth element-containing catalyst including a functional group in at least one terminal, particularly, a modified polymer including a functional group in at least one terminal and/or a polymer main chain, and may include a modified polymer unit including the functional group and an unmodified polymer unit not including the functional group. That is, the modified polymer unit and the unmodified polymer unit represent constituent units composing one polymer in the present invention, and the conjugated diene-based polymer may be composed of a modified polymer unit and an unmodified polymer unit. Here, the functional group represents a functional group derived from a modifier and a group having affinity with a filler In an embodiment of the present invention, a preparation method of the modified conjugated diene-based polymer may include a step of polymerizing a conjugated diene-based monomer in the presence of a lanthanide rare earth element catalyst composition to prepare an active polymer including an organometal part (Step A); and a step of performing a modification reaction for reacting the active polymer with a modifier.

Here, commonly applied reaction conditions in the art may be applied to the preparation step of the active polymer and the modification reaction step. For example, a solution reaction or a solid reaction may be applied, particularly, a solution reaction may be applied. In another embodiment, the polymerization reaction of the active polymer and the modification reaction may be performed using a batch-type reactor or may be performed by a continuous-type using an apparatus such as a multistage continuous-type reactor and an in-line mixer.

In another embodiment, the polymerization reaction and the modification reaction may be performed under similar temperature and pressure conditions as common conditions, particularly, at a temperature of 20 to 100° C. Within this range, the viscosity of a polymer may not increase, and the activated terminal of the polymer may not be deactivated.

The conjugated diene-based polymer catalyzed with the lanthanide rare earth element may represent a conjugated diene-based polymer derived from a catalyst composition including a lanthanide rare earth element-containing compound, i.e., a conjugated diene-based polymer including an activated organometal part derived from a catalyst, and may be prepared by polymerizing a conjugated diene-based monomer in the presence of the catalyst composition. Here, the conjugated diene-based polymer may be a butadiene homopolymer such as polybutadiene, or a butadiene copolymer such as a butadiene-isoprene copolymer.

In a particular embodiment, the conjugated diene-based polymer may include 80 to 100 wt % of a repeating unit derived from a 1,3-butadiene monomer, and selectively 20 wt % or less of a repeating unit derived from other conjugated diene-based monomer which is copolymerizable with 1,3-butadiene. Within the above-mentioned ranges, effect of not decreasing the 1,4-cis bond content in a polymer may be achieved. In this case, the 1,3-butadiene monomer may include 1,3-butadiene or the derivatives thereof such as 1,3-butadiene, 2,3-dimethyl-1,3-butadiene, and 2-ethyl-1,3-butadiene. The other conjugated diene-based monomer which is copolymerizable with 1,3-butadiene may include 2-methyl-1,3-pentadiene, 1,3-pentadiene, 3-methyl-1,3-pentadiene, 4-methyl-1,3-pentadiene, 1,3-hexadiene or 2,4-hexadiene, and any one among the compounds or a compound of two or more thereof may be used.

According to an embodiment of the present invention, the conjugated diene-based polymer may particularly be a butadiene-based polymer catalyzed with neodymium, including a repeating unit derived from a 1,3-butadiene monomer.

In the present invention, the activated organometal part of the conjugated diene-based polymer may be an activated organometal part at the terminal of the conjugated diene-based polymer (activated organometal part at the terminal of a molecular chain), an activated organometal part in a main chain, or an activated organometal part in a side chain. Among them, in case where an activated organometal part of a conjugated diene-based polymer is obtained by anionic polymerization or coordination anionic polymerization, the activated organometal part may be an activated organometal part at the terminal.

Meanwhile, the catalyst composition may include a lanthanide rare earth element-containing compound, an alkylating agent, and a halogen compound.

As the lanthanide rare earth element-containing compound, any one used for the preparation of a common conjugated diene-based polymer may be used, without specific limitation. For example, the lanthanide rare earth element-containing compound may be a compound including one or two or more rare earth metals of atomic numbers of 57 to 71 such as lanthanum, neodymium, cerium, gadolinium and praseodymium, and more particularly, a compound including one or two or more selected from the group consisting of neodymium, lanthanum and gadolinium, may be used.

In addition, the lanthanide rare earth element-containing compound may be rare earth metal-containing carboxylates (for example, neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, deodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium idodide, neodymium cyanide, neodymium cyanate, neodymium thiocyanate, neodymium azide, etc.), oxyhalides (for example, neodymium oxyfluoride, neodymium oxychloride, neodymium oxybromide, etc.), or organic lanthanide rare earth element-containing compounds including one or more rare earth metal-carbon bonds (for example, $Cp_3Ln$, $Cp_2LnR$, $Cp_2LnCl$, $CpLnCl_2$, CpLn (cyclooctatetraene), $(C_5Me_5)_2LnR$, $LnR_3$, $Ln(allyl)_3$, $Ln(allyl)_2Cl$, etc., where Ln is a rare earth metal element, and R is a hydrocarbyl group as defined above), etc. and may include any one or a mixture of two or more thereof.

Particularly, the lanthanide rare earth element-containing compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, or a mixture of two or more thereof. In addition, in consideration of excellent solubility in a polymerization solvent without fear of oligomerization, excellent conversion ratio into catalytically active species and consequent improving effect of catalytic activity, the neodymium compound may be any one selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$, or a mixture of two or more thereof.

The alkylating agent is soluble in a non-polar solvent, particularly, a non-polar hydrocarbon-based solvent, and may be an organometallic compound including a bond between a cationic metal such as metals in group 1, 2, or 3 with carbon, or a boron-containing compound. More particularly, the alkylating agent may be any one selected from the group consisting of an organoaluminum compound, an organomagnesium compound, and an organolithium compound, or a mixture of two or more thereof.

The organoaluminum compound may include dihydrocarbylaluminum hydride such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydride such as ethylaluminum dihydride, n-propylaluminum dihydride, isopropylaluminum dihydride, n-butylaluminum dihydride, isobutylaluminum dihydride, and n-octylaluminum dihydride. In addition, the organoaluminum compound may be aluminoxanes. The aluminoxane may be prepared by reacting trihydrocarbyl aluminum-based compounds with water. More particularly, the aluminoxane may be methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one among them or a mixture of two or more thereof may be used.

The organomagnesium compound may include at least one magnesium-carbon bond and is a magnesium compound which may be dissolved in a non-polar solvent, particularly, a non-polar hydrocarbon-based solvent. Particularly, the organomagnesium compound may include an alkylmagnesium compound such as diethylmagnesium, di-n-propylmagnesium, diisopropylmagnesium, dibutylmagnesium, dihexylmagnesium, diphenylmagnesium and dibenzylmagnesium; a hydrocarbyl magnesium hydride such as methyl magnesium hydride, ethyl magnesium hydride, butyl magnesium hydride, hexyl magnesium hydride, phenyl magnesium hydride, and benzyl magnesium hydride; a hydrocarbyl magnesium halide such as methyl magnesium chloride, ethyl magnesium chloride, butyl magnesium chloride, hexyl magnesium chloride, phenyl magnesium chloride, benzyl magnesium chloride, methyl magnesium bromide, ethyl magnesium bromide, butyl magnesium bromide, hexyl magnesium bromide, phenyl magnesium bromide, and benzyl magnesium bromide; a hydrocarbyl magnesium carboxylate such as methyl magnesium hexanoate, ethyl magnesium hexanoate, butyl magnesium hexanoate, hexyl magnesium hexanoate, phenyl magnesium hexanoate, and benzyl magnesium hexanoate; a hydrocarbyl magnesium alkoxide such as methyl magnesium ethoxide, ethyl magnesium ethoxide, butyl magnesium ethoxide, hexyl magnesium ethoxide, phenyl magnesium ethoxide, and benzyl magnesium ethoxide; or a hydrocarbyl magnesium aryloxide such as methyl magnesium phenoxide, ethyl magnesium phenoxide, butyl magnesium phenoxide, hexyl magnesium phenoxide, phenyl magnesium phenoxide, and benzyl magnesium phenoxide.

In addition, as the alkylating agent, an alkyl lithium of R—Li as an organolithium compound (in this case, R is an alkyl group of 1 to 20 carbon atoms, more particularly, a linear alkyl group of 1 to 8 carbon atoms) may be used. More particularly, methyllithium, ethyllithium, isopropyllithium, n-butyllithium, sec-butyllithium, t-butyllithium, isobutyllithium, pentyllithium, isopentyllithium, etc. may be used, and any one or a mixture of two or more thereof may be used.

The halogen compound may be a diatomic halogen, an interhalogen compound, a hydrogen halide, an organic halide, a nonmetal halide, a metal halide, or an organometal halide, etc., and any one or a mixture of two or more thereof may be used. Among them, in consideration of the improvement of catalytic activity and consequent improving effect of reactivity, the halogen compound may be one selected from the group consisting of an organic halide, a metal halide and an organometal halide, or a mixture of two or more thereof.

Particularly, the diatomic halogen may include fluorine, chlorine, bromine, or iodine.

In addition, the interhalogen compound may particularly include iodine monochloride, iodine monobromide, iodine trichloride, iodine pentafluoride, iodine monofluoride, iodine trifluoride, etc.

In addition, the hydrogen halide may particularly include hydrogen fluoride, hydrogen chloride, hydrogen bromide, or hydrogen iodide.

In addition, the organic halide may particularly include t-butyl chloride (t-BuCl), t-butyl bromide, allyl chloride, allyl bromide, benzyl chloride, benzyl bromide, chloro-diphenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may particularly include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride ($SiCl_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphorus triiodide, phosphorus oxyiodide or selenium tetraiodide.

Also, the metal halide may particularly include tin tetrachloride, tin tetrabromide, aluminum trichloride, aluminum tribromide, antimony trichloride, antimony pentachloride, antimony tribromide, aluminum trifluoride, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometal halide may particularly include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

The catalyst composition according to an embodiment of the present invention may further include a diene-based monomer in addition to the above-described components.

The diene-based monomer may be mixed with a catalyst for polymerization and form a premixing type catalyst, or may be polymerized with components in a catalyst for polymerization, specifically with an alkylating agent such as DIBAH to form a preforming type catalyst. In case of performing such preforming polymerization, catalytic activity may be improved, and a conjugated diene-based polymer thus prepared may be further stabilized.

Particularly, as the diene-based monomer, any one used for the preparation of a common conjugated diene-based polymer may be used, without specific limitation. Particularly, the diene-based monomer may be 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, or the like, and any one among them or a mixture of two or more thereof may be used.

The catalyst composition according to an embodiment of the present invention may further include a hydrocarbon-based solvent in addition to the above-mentioned components.

The hydrocarbon-based solvent may particularly be a non-polar solvent which has no reactivity with the components constituting the catalyst. Particularly, linear, branched or circular aliphatic hydrocarbon of 5 to 20 carbon atoms, such as n-pentane, n-hexane, n-heptane, n-octane, n-nonane, n-decane, isopentane, isohexane, isooctane, 2,2-dimethylbutane, cyclopentane, cyclohexane, methylcyclopentane and methylcyclohexane; a mixture solvent of aliphatic hydrocarbon of 5 to 20 carbon atoms, such as petroleum ether, petroleum spirits, and kerosene; or an aromatic hydrocarbon-based solvent such as benzene, toluene, ethylbenzene, and xylene, and any one or a mixture of two or more thereof may be used. More particularly, the non-polar solvent may be the linear, branched or circular aliphatic hydrocarbon of 5 to 20 carbon atoms, or the mixture solvent of the aliphatic hydrocarbon, and more particularly, n-hexane, cyclohexane, or a mixture thereof may be used.

The modifier may be selected from commonly known materials in this field according to the polymer and modification object, for example, may include one or more functional groups selected from an azacyclopropane group, a ketone group, a carboxyl group, a thiocarboxyl group, a carbonate, a carboxylic acid anhydride, a metal carboxylate, an oxyhalide, a urea group, a thiourea group, an amide group, a thioamide group, an isocyanate group, a thioisocyanate group, a halogenated isocyano group, an epoxy group, a thioepoxy group, an imine group and a M-Z bond (where M is selected from Sn, Si, Ge and P, and Z is a halogen atom), and may be a compound not including an active proton and an onium salt. Accordingly, the functional group may have a wide selection.

In another embodiment, the modifier may be a compound represented by Formula 1 or Formula 2 below.

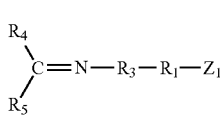

[Formula 1]

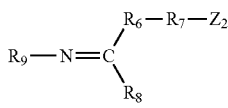

[Formula 2]

in Formula 1 or Formula 2, $Z_1$ and $Z_2$ are each independently a silane group, a N,N-disubstituted aminophenyl group, an imine group or a cyclic amino group, $R_1$ and $R_7$ are each independently a single bond or a divalent organic group, $R_3$ and $R_6$ are each independently a single bond or a divalent organic group; or a trivalent organic group which is connected with $R_4$ or $R_5$, and $R_8$ or $R_9$, respectively, to form a ring; $R_4$ and $R_8$ are each independently a monovalent organic group; or a divalent organic group which is connected with $R_3$ or $R_5$, and $R_6$ or $R_9$, respectively, to from a ring, and $R_5$ and $R_9$ are a monovalent organic group; or a divalent organic group which is connected with $R_3$ or $R_4$, and $R_6$ or $R_8$, respectively, to form a ring.

Particularly, the modifier represented by Formula 1 or formula 2 may be, for example, N-(3-triethoxysilylpropyl)-4,5-dihydroimidazole, N-(1,3-dimethylbutylidene)-3-triethoxysilyl)-1-propane amine, an oligomer thereof or a mixture thereof; dimethylaminobenzylidene ethylamine, diethyl aminobenzylidene butyl aminedimethylaminobenzylidene aniline, dimethylaminobenzylidene n-butylaniline, dimethylaminobenzylidene dodecyl aniline, dimethylaminobenzylidene methoxyaniline, dimethylaminobenzylidene dimethylaminoaniline, bis(dimethylaminophenyl)methylidene butyl amine, bis(dimethylaminophenyl)methylidene n-octyl amine, bis(diethyl aminophenyl)methylidenebutyl amine, bis(diethyl aminophenyl) methylidene n-octyl amine, benzylidene dimethylaminoaniline, methoxybenzylidene dimethylaminoaniline, 1-methyl-4-pentene-2-yl-methylidene dimethylaniline, 1,3-dimethylbutylidene dimethylaniline or a mixture thereof; phenylenebis(dimethylaminobenzylidene amine); benzylidene(1-hexamethyleneimino) aniline, benzylidene(1-pyrrolidino)aniline, dimethylaminobenzylidene(1-hexamethyleneimino)aniline, dimethylaminobenzylidene(1-pyrrolidino)aniline, (1-hexamethyleneimino)benzylidene aniline, (1-pyrrolidino)benzylidene aniline, benzylidene((4-n-butyl-1-piperazino) methyl) aniline, benzylidene((3-(1-methyl) pyrrolidino) methyl)aniline, ((4-n-butyl-1-piperazino)methyl) benzylideneaniline, ((3-(1-methyl) pyrrolidino) methyl) benzylidene aniline or a mixture thereof.

In an embodiment of the present invention, the modification ratio is a value calculated by the following Mathematical Formula 2 using a chromatogram obtained by chromatography measurement, wherein the chromatography measurement is characterized in including: dissolving a polymer including a modified polymer unit and an unmodified polymer unit in a first solvent to prepare a first solution; injecting the first solution into a column filled with an adsorbent; adsorbing the modified polymer unit onto the adsorbent and eluting the first solution in which the unmodified polymer unit is dissolved; transporting the eluted first solution to a detector; injecting a second solvent into the column to elute a second solution in which the adsorbed modified polymer unit is dissolved; and transporting the eluted second solution to the detector:

$$\text{modification ratio}(\%) = \frac{\text{peak area of modified polymer}}{\text{peak area of unmodified polymer} + \text{peak area of modified polymer}} \times 100$$

[Mathematical Formula 2]

In Mathematical Formula 2, the peak area of the unmodified polymer unit is the peak area of a chromatogram with respect to the first solution transported to the detector, and the peak area of the modified polymer unit is the peak area of a chromatogram with respect to the second solution transported to the detector.

In the present invention, the modification ratio may mean, for example, the ratio of a modified polymer with respect to an unmodified polymer when a polymer including a polymerization active part is modified with a modifier, and may be represented by percentage (%) with respect to the total of the modified polymer and the unmodified polymer.

In the present invention, the column may be a column used for chromatography, for example, a normal phase column of which stationary phase is polar and mobile phase is non-polar, or a reverse phase column of which stationary phase is non-polar and mobile phase is polar.

The adsorbent according to an embodiment of the present invention means the stationary phase of the column, and may be a filler filling the column. The adsorbent may be appropriately selected according to a modified part by the modifier. The adsorbent may be one selected from the group consisting of a silica-based adsorbent, a polymer-based adsorbent, an alumina ($Al_2O_3$) adsorbent, a graphitized carbon adsorbent and a zirconia adsorbent, particularly, a silica-based adsorbent. In this case, the adsorption of diverse modified polymers may be favorable.

The silica-based adsorbent may be, for example, one or more selected from the group consisting of a silica gel adsorbent derived from silica ($SiO_2$); and an adsorbent obtained by substituting the silanol group (Si—OH) at the surface of the silica gel with, or by end-capping with one or more derived units selected from the group consisting of a chain-type, branch-type or cyclic alkylsilane of 1 to 30 carbon atoms, an arylsilane of 5 to 30 carbon atoms, a chain-type, branch-type or cyclic alkylcyanosilane of 1 to 30 carbon atoms, and a chain-type, branch-type or cyclic aminoalkylsilane of 1 to 30 carbon atoms, particularly, one or more selected from the group consisting of a silica gel adsorbent; and an end-capping adsorbent with one or more derived units selected from the group consisting of trimethylsilane, ethyl(dimethyl)silane, propyl(dimethyl)silane, butyl(dimethyl)silane, octyl(dimethyl)silane, decyl(dimethyl)silane, octadecyl(dimethyl)silane, cyanopropyl(dimethyl)silane, aminopropyl(dimethyl)silane and 4-phenylbutyl(dimethyl)silane.

The adsorbent may, for example, have a particle size of 0.001 to 100 μm, 1 to 100 μm, 1 to 50 μm, or 3 to 30 μm, and within this range, the adsorption of a modified polymer may be favorable. The particle size may mean an average particle diameter according to the shape of the adsorbent, particularly, if the shape of the adsorbent is spherical or elliptical, the particle size may mean an average particle diameter with respect to the diameter or the major axis. If the adsorbent has a polyhedron shape, the particle size may mean an average particle diameter with respect to the major axis.

Meanwhile, in the measurement method of the modification ratio of the conjugated diene-based polymer according to an embodiment of the present invention, different adsorbents may be applied in accordance with the modified polymers. Particularly, the modified polymer according to an embodiment of the present invention may include a functional group including an amine group in at least one terminal, and in this case, the adsorbent may be a silica-based adsorbent which is substituted with the functional group including an amine group.

According to an embodiment of the present invention, the first solvent and the second solvent may be each independently a polar solvent or a non-polar solvent. Particularly, if the first solvent is a polar solvent, the second solvent may be a non-polar solvent, and if the first solvent is a non-polar solvent, the second solvent may be a polar solvent, and in this case, effects of more efficiently eluting the unmodified polymer from the first solution and the modified polymer from the second solution, respectively, may be achieved.

In another embodiment, the first solvent and the second solvent may be each independently a polar solvent having different polarity. Particularly, if the first solvent is a polar solvent having high polarity, the second solvent may be a polar solvent having low polarity, and if the first solvent is a polar solvent having low polarity, the second solvent may be a polar solvent having high polarity. The polarity is not represented by an absolute value but may be relative concept in accordance with the polarity of a polar solvent used as each of the first solvent and the second solvent. In this case, effects of more efficiently eluting the unmodified polymer from the first solution and the modified polymer from the second solution, respectively, may be achieved.

The polar solvent may be used in chromatography and may be any polar solvent that is capable of dissolving a modified polymer and an unmodified polymer, without limitation. For example, one or more selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethyl sulfoxide (DMSO), methyl ethyl ketone, benzonitrile, pyridine, nitroethane, benzyl alcohol, methoxy ethanol and formamide, may be used.

The non-polar solvent may be used in chromatography and may be any polar solvent that is capable of dissolving a modified polymer and an unmodified polymer, without limitation. For example, one or more selected from the group consisting of hexane, benzene, toluene, diethyl ether, chloroform, ethyl acetate, dichloromethane, cyclohexane, tetrachloromethane, iso-octane, xylene, butyl ether, isopropyl ether, and ethylene chloride, may be used.

According to an embodiment of the present invention, the first solvent may be injected in a flow rate of 0.01 to 10.0 ml/min, or 0.5 to 2.0 ml/min, and within this range, the entire quantity of the modified polymer may be more efficiently adsorbed onto the adsorbent, and only the unmodified polymer may be eluted together with the first solution.

According to an embodiment of the present invention, the second solvent may be injected in a flow rate of 0.01 to 10.0 ml/min, or 0.5 to 2.0 ml/min, and within this range, effects of more efficiently eluting the second solution in which the modified polymer adsorbed onto the adsorbent is dissolved, may be achieved.

In addition, the first solution and the second solution may be controlled for easy elution of the unmodified polymer or the second solution within the above-mentioned ranges according to the volume of each column (the length or diameter of the column).

According to an embodiment of the present invention, the second solvent may be injected after eluting the entire quantity of the unmodified polymer. The point when the entire quantity of the unmodified polymer is eluted may mean a point when the signal of the unmodified polymer is not detected any more from a detector. In another embodiment, the second solvent may be injected into the column to which the first solution has been injected after finishing the injection of the first solution. Particularly, the second solvent may be continuously injected into the column to which the first solution has been injected according to a gradient elution by which the composition of a solvent is continuously changed. In this case, effects of more accurate detection without losing signals during the detection may be achieved.

Figure 2:
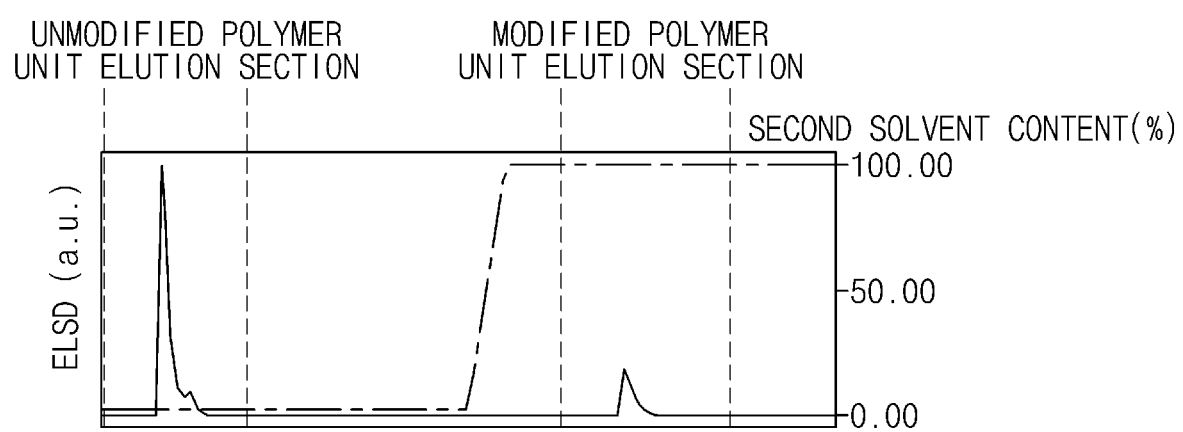
FIG. 2 is a chromatogram showing detection solution change in accordance with the injection of a second solvent in the measurement method of a modification ratio according to an embodiment of the present invention.

According to an embodiment of the present invention, if the second solvent is continuously injected according to the gradient elution into the column to which the first solution has been injected, the first solution and the second solution may be eluted at the same time from the injection point of the second solvent, and the eluted first solution and second solution at the same time may be transported to the detector at the same time. In addition, with respect to the quantity of 100 vol % of the first solution and the second solution transported to the detector, the quantity of the first solution and the second solution may gradually increase or decrease according to the injection rate of the second solvent from the injection point of the second solvent, respectively, that is, the first solution may gradually decrease from 100 vol % to 0 vol % and the second solution may gradually increase from 0 vol % to 100 vol %. In a particular embodiment, from the injection point of the second solvent, the first solution and the second solution may be detected in the detector at the same time, and according to the injection of the second solvent, the detection amount of the previously injected first solution may decrease from 100 vol % to 0 vol %, and the detection amount of the second solution may increase from 0 vol % to 100 vol % by the decreased detection amount of the first solution. After completing the elution of the first solution, only the second solution may be detected (see FIG. 2).

According to an embodiment of the present invention, the measurement method of the modification ratio of the conjugated diene-based polymer is conducted using a chromatography measurement apparatus, for example, a liquid chromatography measurement apparatus, particularly, a chromatography measurement apparatus including a mobile phase reservoir for storing a first solution and a second solvent, a pump for constantly and reproducibly supplying a mobile phase to a column, a sample injector for controlling the injection volume of a solution into the column or the injection volume of a solvent, a column for separating a modified polymer and an unmodified polymer, and a detector for detecting eluted modified polymer or unmodified polymer.

The mobile phase reservoir may be two or more, particularly, a mobile phase reservoir for storing the first solution and a mobile phase reservoir for storing the second solvent may be respectively provided. In addition, the mobile phase reservoir may include a separate gradient elution apparatus for the application of gradient elution.

For example, the pump may generate a pressure of 0.1 to 10,000 psi or 100 to 5,000 psi, may control a flow rate to 0.01 to 20 ml or 0.1 to 10 ml, may generate no pulse during supplying a solution or a solvent, and may keep a flow rate change of 1% or less, or 0.1 to 0.5%. In another embodiment, the pump may be a single-head pump or a dual-head pump, particularly, a dual-head pump, and in this case, the application of gradient elution may be favorable.

The injector may be, for example, a Rheodyne injector or an automatic injector, and the Rheodyne injector may have, for example, a loop volume of 1 to 500 µl, 5 to 200 µl, or 10 to 100 µl, and within this range, injection accuracy may be high.

The detector, for example, may be selected from a UV/Vis detector, a fluorescence detector, a refractive index detector and an evaporative light scattering detector, particularly, an evaporative light scattering detector. In this case, a response factor may be constant, accurate component analysis may be possible without making an analytical calibration curve based on a standard material, detection by gradient elution may be possible, and separation performance and separation sensitivity are excellent.

In an embodiment of the present invention, a modification ratio was measured using an evaporative light scattering detector (ELSD) of Waters Co. as the detector and injecting a specimen prepared in 1.0 mg/ml with a loop volume of 100 µl.

The method for preparing a rubber composition according to another embodiment of the present invention is characterized in including a step of polymerizing a conjugated diene-based monomer in the presence of a catalyst composition in a hydrocarbon solvent to prepare an active polymer; a step of modifying one terminal of the active polymer with a modifier having a purity of 92.0% or more to prepare a modified conjugated diene-based polymer; and a step of mixing the modified conjugated diene-based polymer; a filler; and a vulcanizing agent.

The details on the properties of the rubber composition, the correlation between the modification ratio and the viscoelasticity loss coefficient of the rubber composition and the purity of the modifier are the same as described above, and the explanation thereof will be omitted.

In addition, in an embodiment of the present invention, the dynamic viscoelasticity loss coefficient (tan δ) is used as the index of a fuel consumption ratio. If the dynamic viscoelasticity loss coefficient value at 60° C. decreases, hysteresis loss may decrease, rotational resistance properties may be improved, and thus, a fuel consumption ratio may be improved.

In the present invention, the dynamic viscoelasticity loss coefficient was measured by obtaining a specimen through vulcanizing a rubber composition at 150° C. for 90 minutes, and measuring using a dynamic mechanical analyzer of TA Co. with a twist mode and a frequency of 10 Hz, at a strain ratio of 3% at 60° C.

In addition, the rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, the improving effects of the abrasion resistance and crack resistance of a molded article manufactured using the rubber composition, for example, a tire may be insignificant.

In addition, the rubber composition may further include other rubber components in addition to the modified conjugated diene-based polymer as necessary, and in this case, the rubber component may be included in an amount of 90 wt % or less with respect to the total weight of the rubber composition. Particularly, the rubber component may be included in an amount of 1 part by weight to 900 parts by weight with respect to 100 parts by weight of the modified conjugated diene-based polymer.

The rubber component may be a natural rubber or a synthetic rubber, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one or a mixture of two or more thereof may be used.

In addition, the rubber composition may include 0.1 parts by weight to 150 parts by weight of a filler with respect to 100 parts by weight of the modified conjugated diene-based polymer, and the filler may be silica-based, carbon black or a combination thereof. Particularly, the filler may be carbon black.

The carbon black filler is not specifically limited but may have a nitrogen adsorption specific surface area of, for example, 20 m$^2$/g to 250 m$^2$/g (measured based on N2SA, JIS K 6217-2:2001). Also, the carbon black may have a dibutylphthalate oil absorption amount (DBP) of 80 cc/100 g to 200 cc/100 g. If the nitrogen adsorption specific surface area of the carbon black is greater than 250 m$^2$/g, the processability of a rubber composition may be deteriorated, and if the nitrogen adsorption specific surface area of the carbon black is less than 20 m$^2$/g, reinforcing performance by the carbon black may be insignificant. In addition, if the DBP oil absorption amount of the carbon black is greater than 200 cc/100 g, the processability of the rubber composition may be deteriorated, and if the DBP oil absorption amount of the carbon black is less than 80 cc/100 g, reinforcing performance by the carbon black may be insignificant.

In addition, the silica is not specifically limited, but may include, for example, wet silica (hydrated silica), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, N2SA) of 120 m$^2$/g to 180 m$^2$/g, and cetyl trimethyl ammonium bromide (CTAB) absorption specific surface area of 100 m$^2$/g to 200 m$^2$/g. If the nitrogen absorption specific surface area of the silica is less than 120 m$^2$/g, the reinforcing performance due to silica may be deteriorated, and if the nitrogen absorption specific surface area of the silica is greater than 180 m$^2$/g, the processability of the rubber composition may be deteriorated. In addition, if the CTAB absorption specific surface area of the silica is less than 100 m$^2$/g, the reinforcing performance by the silica filler may be deteriorated, and if the CTAB absorption specific surface area of the silica is greater than 200 m$^2$/g, the processability of the rubber composition may be deteriorated.

Meanwhile, if the silica is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur crosslinkable, and so may further include a vulcanizing agent. The vulcanizing agent may be particularly a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight with respect to 100 parts by weight of the rubber component.

In addition, the process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount range, the deterioration of the tensile strength and low exothermic properties (low fuel consumption ratio) of a vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and excellent abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

EXAMPLES

Hereinafter, the present invention will be explained in particular referring to embodiments. However, the embodiments below are only for illustrating the present invention, and the scope of the present invention is not limited thereto.

Preparation Example 1-1: Preparation of Catalyst Composition 1

To a hexane solvent under nitrogen conditions, a neodymium carboxylic acid compound was added and diisobutylaluminum hydride (DIBAH) and diethylaluminum chloride (DEAC) were added thereto one by one so that the molar ratio of neodymium compound:DIBAH:DEAC=1: 9-10:2-3 was satisfied, followed by mixing to prepare a catalyst composition. The catalyst composition thus prepared was readily used or used after storing under nitrogen conditions at −30 to 20° C.

Preparation Example 1-2: Preparation of ethyl 1-(trimethylsilyl)piperidine-4-carboxylate To a solution obtained by dissolving 2 g of ethyl piperidine-4-carboxylate in dichloromethane ($CH_2Cl_2$), 1.77 ml of triethylamine ($Et_3N$) and 1.62 ml of trimethylsilyl chloride ($TMSCl_3$) were added at 0° C., followed by stirring for 5 hours. Then, solvents were evaporated from the product solution under a reduced pressure, and the resultant product was re-dissolved in hexane and filtered to obtain 1-(trimethylsilyl)piperidine-4-carboxylate, and this compound was identified by $^1H$ nuclear magnetic resonance spectroscopic spectrum.

$^1H$ NMR (500 MHz, $CDCl_3$) δ 4.11-4.08 (m, 2H), 3.13-3.11 (m, 2H), 2.61-2.54 (m, 2H), 2.34-2.32 (m, 1H), 1.74 (m, 2H), 1.42 (m, 2H), 1.23-1.22 (m, 3H), 0.05-0.00 (m, 9H).

Preparation Example 2-1

By controlling a modifier, a catalyst composition and reaction conditions, a terminal modified butadiene polymer having a different modification ratio was prepared.

To a completely dried reactor, vacuum and nitrogen were alternately applied. To the reactor in vacuum, 4.7 kg (1,3-butadiene content=500 g) of a mixture solution of 1,3-butadiene/hexane was added, the catalyst composition prepared in Preparation Example 1-1 was added, and polymerization reaction was performed at 60-90° C. for 15-60 minutes to prepare an active butadiene polymer including an activated aluminum part at the terminal. Ethyl 1-(trimethylsilyl)piperidine-4-carboxylate prepared in Preparation Example 1-2 was injected thereto as a modifier and reacted at the same temperature conditions as the polymerization temperature for 30 to 60 minutes ([modifier]:[Nd]=1-10:1 eq). Then, a hexane solution including a polymerization quenching agent and a hexane solution including an antioxidant were added to finish the reaction.

The polymer thus obtained was added to hot water heated by steam and stirred to remove solvents, and roll drying was performed to remove residual solvents and water to prepare a terminal modified butadiene polymer.

Preparation Example 2-2

A terminal modified butadiene polymer was prepared by the same method as in Preparation Example 2-1 except for applying a modifier having a purity described in Table 1 below with an injection amount (parts by weight with respect to 100 parts by weight of a monomer) described in Table 1.

Comparative Preparation Examples 2-1 to 2-3

Terminal modified butadiene polymers were prepared by the same method as in Preparation Example 2-1 except for applying a modifier having purity described in Table 1 below with injection amounts (parts by weight with respect to 100 parts by weight of a monomer) described in Table 1.

Comparative Preparation Example 2-4

To a completely dried reactor, vacuum and nitrogen were alternately applied. To the reactor in vacuum, 4.7 kg (1,3-butadiene content=500 g) of a mixture solution of 1,3-butadiene/hexane was added, the catalyst composition prepared in Preparation Example 1 was added, and polymerization reaction was performed at 70° C. for 60 minutes. Then, a hexane solution including a polymerization quenching agent and a hexane solution including an antioxidant were added to finish the reaction.

The polymer thus obtained was added to hot water heated by steam and stirred to remove solvents, and roll drying was performed to remove residual solvents and water to prepare an unmodified butadiene polymer.

Evaluation of Physical Properties of Polymers

The properties of the modified butadiene polymers prepared in Preparation Examples 2-1 to 2-5 were evaluated with respect to items below, and the results are listed in Table 1 below.

1) Mooney Viscosity (RP, Raw Polymer) and —S/R Value

For each polymer, mooney viscosity (ML1+4, @100° C.) (MU) was measured by using MV2000E (Monsanto Co., Ltd.) using Large Rotor at conditions of a rotor speed of 2±0.02 rpm at 100° C. In this case, a specimen used was stood at room temperature (23±3° C.) for 30 minutes or more, and 27±3 g of the specimen was collected and put in a die cavity, and then, platen was operated and the mooney viscosity was measured while applying torque. In addition, after measuring the mooney viscosity, the change of the mooney viscosity while relaxing torque was observed for 1 minute, and from the grade value thereof, a —S/R value was determined.

2) Measurement of Cis Bond Content

The cis bond content in each polymer was measured using Varian VNMRS 500 MHz NMR, and 1,1,2,2-tetrachloroethane D2 (Cambridge Isotope Co.) was used as a solvent.

3) Molecular Weight Distribution (MWD)

Each polymer was dissolved in tetrahydrofuran (THF) under 40° C. conditions for 30 minutes, loaded on gel permeation chromatography (GPC) and flowed. In this case, two columns of PLgel Olexis, which is a trade name of Polymer Laboratories Co. Ltd., and one column of PLgel mixed-C were used in combination. Also, newly replaced columns were all mixed bed type columns, and polystyrene was used as a GPC standard material.

4) Measurement of Purity of Modifier

The purity of a modifier was measured by the peak area % of a target material among detected materials by using gas chromatograph and mass spectroscopy.

5) Measurement of Modification Ratio

A polymer was dissolved in cyclohexane and stored in each mobile phase reservoir of specimen (prepared in 1.0 mg/ml each), and tetrahydrofuran (THF) was stored in another mobile phase reservoir. The mobile phase reservoir was connected to a dual-head pump, and a solution of the mobile phase reservoir, in which the polymer was dissolved was injected first into a column filled with a silica adsorbent through the pump and an injector having a loop volume of 100 μl. In this case, the pressure of the pump was 450 psi, and an injection rate was 0.7 ml/min. Then, after checking that an unmodified butadiene polymer unit in the polymer was not detected any more from a detector (ELSD, Waters Co.), based on 5 minutes from the initiation of the injection, the tetrahydrofuran was injected into the column through the pump. In this case, the pressure of the pump was 380 psi, and an injection rate was 0.7 ml/min. After checking that a modified butadiene polymer unit in the polymer was not detected any more from the detector according to the injection of tetrahydrofuran, the injection of the second solvent was finished. Then, from the detected chromatogram results, a modification ratio (%) was calculated according to the following Mathematical Formula 2:

$$\text{modification ratio (\%)} = \frac{\text{peak area of modified polymer}}{\text{peak area of unmodified polymer} + \text{peak area of modified polymer}} \times 100 \qquad \text{[Mathematical Formula 2]}$$

TABLE 1

| Division | Preparation Exam 2-1 | Preparation Exam 2-2 | Preparation Exam 2-3 | Comp. Preparation Example 2-1 | Comp. Preparation Example 2-2 | Comp. Preparation Example 2-3 | Comp. Preparation Example 2-4 |
|---|---|---|---|---|---|---|---|
| Modifier injection amount | 0.23 | 0.23 | 0.23 | 0.25 | 0.24 | 0.23 | — |
| Modifier purity | 93.4 | 92.2 | 90.5 | 89.0 | 89.0 | 89.0 | — |
| Calculated injection amount * | 0.215 | 0.212 | 0.208 | 0.225 | 0.214 | 0.205 | — |
| Modification ratio | 41 | 29 | 26 | 22 | 20 | 18 | 0 |
| Mooney viscosity | 43.7 | 46.0 | 44.3 | 45.2 | 44.3 | 42.3 | 47.3 |
| -S/R | 0.694 | 0.582 | 0.602 | 0.593 | 0.588 | 0.507 | 0.647 |
| Cis bond content (cis) | 97.9 | 96.7 | 96.8 | 96.8 | 96.8 | 96.3 | 96.9 |
| Molecular weight distribution (MWD) | 2.69 | 2.60 | 2.61 | 2.64 | 2.64 | 2.64 | 2.53 |

* calculated injection amount: calculated value of modifier injection amount with purity Referring to Table 1, it may be found that with the increase of the purity of the modifier, the modification ratio may increase and accordingly, linearity and cis bond content may be gradually improved. In addition, beta values are significantly higher than Comparative Preparation Examples which correspond to unmodified polymers, and thus, polymers having excellent linearity could be prepared.

In addition, referring to Preparation Examples 2-1 and 2-2 and Comparative Preparation Examples 2-2 to 2-4, the injection amounts of the modifiers are almost equivalent. In case of using a greater amount of the modifier in practice, which is obtained by calculating using the purity of the modifier (Comparative Examples 1 and 2), it may be found that the purity of the modifier influences the modification ratio. When comparing Preparation Examples 2-1 to 2-3 with Comparative Example 2-3, which used the same amount of the modifier, it may be found that the modification ratio is significantly increased with the purity from about 90%, and the modification ratio is increased by a great deal once more with the purity from 93% or more. That is, it may be found that if a modifier having a purity of 90% or more is applied, excellent modification ratio may be achieved.

Examples 1 to 3 and Comparative Examples 1 to 3

Based on 100 parts by weight of each of the terminal modified butadiene polymers prepared in Preparation Examples 2-1 and 2-2 and Comparative Preparation Examples 2-1 to 2-3, 70 parts by weight of carbon black, 22.5 parts by weight of a process oil, 2 parts by weight of an antiaging agent (TMDQ), 3 parts by weight of zinc oxide (ZnO), and 2 parts by weight of stearic acid were mixed to prepare a first composition. To the first composition, 2 parts by weight of sulfur, 2 parts by weight of a vulcanization accelerator (CZ), and 0.5 parts by weight of a vulcanization accelerator (DPG) were added, followed by gently mixing at 50° C. for 1.5 minutes in 50 rpm to prepare each rubber composition.

In addition, a fuel consumption ratio improvement index according to a modification ratio, i.e., a dynamic viscoelasticity loss coefficient (tan δ) at 60° C., was estimated according to Mathematical Formula 1 below.

$$Y = \frac{A}{0.6854X + 93.955} \qquad \text{[Mathematical Formula 100A]}$$

In Mathematical Formula 1, X is a modification ratio of the modified conjugated diene-based polymer, A is a dynamic viscoelasticity loss coefficient (tan δ) at 60° C. of a rubber composition including an unmodified conjugated diene-based polymer, where an unmodified polymer having a value of 0.152 was applied in these embodiments, and Y is a dynamic viscoelasticity loss coefficient (tan δ) at 60° C. of a rubber composition including a modified conjugated diene-based polymer

TABLE 2

| Division | Purity of modifier | X (modification ratio) | Y (viscoelasticity loss coefficient) | A |
|---|---|---|---|---|
| Example 1 | 93.4 | 41 | 0.1245 | 0.1520 |
| Example 2 | 92.2 | 29 | 0.1335 | |
| Example 3 | 90.5 | 26 | 0.1359 | |
| Comparative Example 1 | 89.0 | 22 | 0.1394 | |
| Comparative Example 2 | 89.0 | 20 | 0.1411 | |
| Comparative Example 3 | 89.0 | 18 | 0.1430 | |

Comparative Example 4

A rubber composition was prepared by the same method as in Example 1 except for using the unmodified butadiene polymer prepared in Comparative Preparation Example 2-4 instead of the modified butadiene polymer.

Experimental Examples

Using the rubber composition prepared in each of the Examples and the Comparative Examples, a specimen was formed, and tensile properties and viscoelasticity properties were measured and listed in Table 3 below.

Each specimen was formed by vulcanizing each rubber composition at 160° C. for 25 minutes.

1) Evaluation of Tensile Properties

The tensile properties of the specimen thus formed were measured after vulcanizing the specimen at 150° C. for t90 minutes, by measuring tensile stress when breaking the specimen, and tensile stress when elongated by 300% (300% modulus) according to an ASTM D412 tensile test method. In this case, each measured value was indexed with the measured value of 100 of the Comparative Example.

2) Evaluation of Viscoelasticity Properties

The viscoelasticity properties of the specimen thus formed were measured as a viscoelasticity coefficient (tan δ) at 60° C. using a dynamic mechanical analyzer of TA Co., Ltd. in a twist mode with a frequency of 10 Hz and a deformation ratio of 3%. In this case, "Index" was indexed with the measured value of 100 of the measured value of the unmodified polymer. Meanwhile, the tan δ value at 60° C. represents a fuel consumption ratio.

TABLE 3

| Division | Example 1 | Example 2 | Example 3 | Comp. Example 1 | Comp. Example 2 | Comp. Example 3 | Comp. Example 4 |
|---|---|---|---|---|---|---|---|
| 300% modulus (kgf/cm$^2$) | 113 | 109 | 110 | 107 | 106 | 110 | 107 |
| Tan δ at 60° C. | 0.124 | 0.131 | 0.133 | 0.139 | 0.141 | 0.145 | 0.152 |
| Tan δ at 60° C. (Index) | 122 | 116 | 114 | 109 | 108 | 105 | 100 |

As shown in Table 3, tan δ at 60° C. of each of the rubber compositions of the Examples 1 to 3 showed an almost similar value as each Y value shown in Table 1 and a value of 0.14 or less. Thus, it is secured that viscoelasticity properties are excellent.

This means that the accuracy of Mathematical Formula 1 which is a regression equation, showing the correlation between the modification ratio of the modified conjugated diene-based polymer and the dynamic viscoelasticity loss coefficient at 60° C. of the rubber composition according to the present invention, is high. Through the control of the purity of the modifier, a rubber composition having excellent viscoelasticity coefficient of 0.14 or less may be provided without measurement.

From the results, it may be secured that a rubber composition having an excellent viscoelasticity coefficient may be prepared by determining a modification ratio utilizing Mathematical Formula 1, and this modification ratio may be controlled through the purity of the modifier, and thus, a viscoelasticity coefficient may be controlled to a desired value just with the purity of the modifier.

The invention claimed is:

1. A rubber composition comprising a modified conjugated diene-based polymer; a filler; and a vulcanizing agent, wherein the following Mathematical Formula 1 is satisfied, and
the modified conjugated diene-based polymer is a conjugated diene-based polymer modified with a modifier having a purity of 90.0% or more:

$$Y = \frac{100A}{0.6854X + 93.955} \qquad \text{[Mathematical Formula 1]}$$

in Mathematical Formula 1, X is a modification ratio of the modified conjugated diene-based polymer,
A is a dynamic viscoelasticity loss coefficient (tan δ) at 60° C. of a rubber composition comprising an unmodified conjugated diene-based polymer, and A has a real value of 0.140 to 0.160, and
Y is a dynamic viscoelasticity loss coefficient (tan δ) at 60° C. of a rubber composition comprising the modified conjugated diene-based polymer,
wherein the modifier is ethyl 1-(trimethylsilyl)piperidine-4-carboxylate, and
wherein the modification ratio is a value calculated according to the following Mathematical Formula 2 using a chromatogram obtained by chromatography measurement,
wherein the chromatography measurement is performed by a method comprising:
dissolving a polymer comprising a modified polymer unit and an unmodified polymer unit in a first solvent to prepare a first solution;
injecting the first solution into a column filled with an adsorbent;
adsorbing the modified polymer unit onto the adsorbent and eluting the first solution in which the unmodified polymer unit is dissolved;
transporting the eluted first solution to a detector;
injecting a second solvent into the column to elute a second solution in which the adsorbed modified polymer unit is dissolved; and transporting the eluted second solution to the detector:

$$\text{modification ratio}(\%) = \frac{\text{peak area of an modified polymer}}{\text{peak area of an unmodified polymer} + \text{peak area of a modified polymer}} \times 100 \quad \text{[Mathematical Formula 2]}$$

in Mathematical Formula 2,
the peak area of an unmodified polymer is the peak area of a chromatogram with respect to the first solution transported to the detector, and
the peak area of a modified polymer is the peak area of a chromatogram with respect to the second solution transported to the detector.

2. The rubber composition according to claim 1, wherein the modified conjugated diene-based polymer is the conjugated diene-based polymer catalyzed with a lanthanide rare earth element-containing catalyst, and comprising a functional group in at least one terminal.

3. The rubber composition according to claim 1, wherein the modifier has a purity of 93.0% or more.

4. The rubber composition according to claim 1, wherein the rubber composition comprises 100 parts by weight of the modified conjugated diene-based polymer; 0.1 parts by weight to 150 parts by weight of the filler; and 0.1 parts by weight to 10 parts by weight of the vulcanizing agent.

5. The rubber composition according to claim 1, wherein the adsorbent is a silica-based adsorbent.

6. The rubber composition according to claim 1, wherein the first solvent and the second solvent are each independently a polar solvent or a non-polar solvent, wherein the first solvent and the second solvent have opposite polarities.

7. The rubber composition according to claim 6, wherein the polar solvent is one or more selected from the group consisting of water, methanol, ethanol, n-propanol, n-butanol, isopropanol, formic acid, acetic acid, acetone, nitromethane, propylene carbonate, 1,2-dioxane, 1,3-dioxane, 1,4-dioxane, tetrahydrofuran (THF), acetonitrile (MeCN), dimethylformamide (DMF), dimethylsulfoxide (DMSO), methyl ethyl ketone, benzonitrile, pyridine, nitroethane, benzyl alcohol, methoxy ethanol and formamide.

8. The rubber composition according to claim 6, wherein the non-polar solvent is one or more selected from the group consisting of hexane, benzene, toluene, diethyl ether, chloroform, ethyl acetate, dichloromethane, cyclohexane, tetrachloromethane, iso-octane, xylene, butyl ether, isopropyl ether and ethylene chloride.

9. A method for preparing a rubber composition, the method comprising:
polymerizing a conjugated diene-based monomer in the presence of a catalyst composition in a hydrocarbon solvent to prepare an active polymer;
modifying one terminal of the active polymer with a modifier having a purity of 90.0% or more to prepare a modified conjugated diene-based polymer; and
mixing the modified conjugated diene-based polymer; a filler; and a vulcanizing agent,
wherein the modifier is ethyl 1-(trimethylsilyl)piperidine-4-carboxylate.

10. The method for preparing a rubber composition according to claim 9, wherein the rubber composition satisfies the following mathematical Formula 1:

$$Y = \frac{100A}{0.6854X + 93.955} \quad \text{[Mathematical Formula 1]}$$

in Mathematical Formula 1, X is a modification ratio of the modified conjugated diene-based polymer,
A is a dynamic viscoelasticity loss coefficient (tan δ) at 60° C. of a rubber composition comprising an unmodified conjugated diene-based polymer, A having a real value of 0.140 to 0.160, and
Y is a dynamic viscoelasticity loss coefficient (tan δ) at 60° C. of a rubber composition comprising the modified conjugated diene-based polymer,
wherein the modification ratio is a value calculated according to the following Mathematical Formula 2 using a chromatogram obtained by chromatography measurement,
wherein the chromatography measurement is performed by a method comprising:
dissolving a polymer comprising a modified polymer unit and an unmodified polymer unit in a first solvent to prepare a first solution;
injecting the first solution into a column filled with an adsorbent;
adsorbing the modified polymer unit onto the adsorbent and eluting the first solution in which the unmodified polymer unit is dissolved;
transporting the eluted first solution to a detector;
injecting a second solvent into the column to elute a second solution in which the adsorbed modified polymer unit is dissolved; and
transporting the eluted second solution to the detector:

$$\text{modification ratio}(\%) = \frac{\text{peak area of an modified polymer}}{\text{peak area of an unmodified polymer} + \text{peak are of a modified polymer}} \times 100 \quad \text{[Mathematical Formula 2]}$$

in Mathematical Formula 2,
the peak area of an unmodified polymer is the peak area of a chromatogram with respect to the first solution transported to the detector, and
the peak area of a modified polymer is the peak area of a chromatogram with respect to the second solution transported to the detector.

11. The rubber composition according to claim 1, wherein the modified conjugated diene-based polymer comprises a modified polymer unit comprising a functional group derived from the modifier.

12. The rubber composition according to claim 1, wherein the conjugated diene-based polymer comprises 80 to 100 wt % of a repeating unit derived from a 1,3-butadiene monomer, and 20 wt % or less of a repeating unit derived from other conjugated diene-based monomer which is copolymerizable with 1,3-butadiene.

13. The rubber composition according to claim 1, wherein the first solvent is injected in a flow rate of 0.01 to 10.0 ml/min, and the second solvent is injected in a flow rate of 0.01 to 10.0 ml/min.

* * * * *